(12) United States Patent
Steinberger et al.

(10) Patent No.: US 9,133,885 B2
(45) Date of Patent: Sep. 15, 2015

(54) FRICTION CONTROLLED DAMPER FOR A TORQUE TRANSMISSION DEVICE

(71) Applicant: Schaeffler Technologies GmbH & Co. KG, Herzogenaurach (DE)

(72) Inventors: Markus Steinberger, Macedonia, OH (US); Matthew Payne, Glenmont, OH (US)

(73) Assignee: Schaeffler Technologies AG & Co., KG, Herzogenaurach (DE)

( * ) Notice: Subject to any disclaimer, the term of this patent is extended or adjusted under 35 U.S.C. 154(b) by 0 days.

(21) Appl. No.: 14/148,907

(22) Filed: Jan. 7, 2014

(65) Prior Publication Data

US 2014/0190283 A1    Jul. 10, 2014

Related U.S. Application Data

(60) Provisional application No. 61/749,616, filed on Jan. 7, 2013.

(51) Int. Cl.
*F16H 37/00* (2006.01)
*F16D 3/14* (2006.01)
*B60K 17/28* (2006.01)

(52) U.S. Cl.
CPC .. *F16D 3/14* (2013.01); *B60K 17/28* (2013.01)

(58) Field of Classification Search
CPC ..................................... F16D 3/12; F16D 3/14
USPC ......................................... 74/15.6; 192/70.17
See application file for complete search history.

(56) References Cited

U.S. PATENT DOCUMENTS

2006/0289263 A1* 12/2006 Friedmann et al. .......... 192/48.8
2010/0252390 A1    10/2010 George

\* cited by examiner

*Primary Examiner* — Paul N Dickson
*Assistant Examiner* — Robert A Coker
(74) *Attorney, Agent, or Firm* — Simpson & Simpson, PLLC (57) ABSTRACT

A flange forming an input for the device and including a damper stop tab extending radially outward; a plate including first and second curved slots; and a curved friction assembly including a first end disposed in the first curved slot, a second end disposed in the second curved slot, at least one curved engagement plate including an engagement tab extending radially inward, at least one curved friction plate rotationally fixed to the plate, and a resilient element urging the at least one curved engagement plate and the at least one curved friction plate into contact. The device includes at least one elastic element engaged with the flange.

17 Claims, 6 Drawing Sheets

FRICTION CONTROLLED DAMPER FOR A TORQUE TRANSMISSION DEVICE

CROSS-REFERENCE TO RELATED APPLICATIONS

This application claims the benefit under 35 U.S.C. §119 (e) of U.S. Provisional Patent Application No. 61/749,616, filed Jan. 7, 2013, which application is incorporated herein by reference in its entirety.

TECHNICAL FIELD

The invention relates generally to a torsion damper, and more specifically to a torsion damper for a transmission power take-off.

BACKGROUND

Typically, a power take off (PTO) gear is designed to transmit engine torque to various accessories, such as a fire truck water pump or a hydraulic cylinder for a dump truck via a transmission. During idling of an engine for a vehicle housing the transmission, angular fluctuations occur between a PTO at the transmission and the PTO gear. The angular fluctuations cause undesirable audible noise in the PTO gear, for example, an input element of the PTO gear oscillates with respect to an output element, such as a ring gear, causing the input element to bang against the output element. Further, during start-up of the engine undesirable noise occurs when the engine and transmission system, including the PTO gear, are in a resonance condition. For example, the input element can contact the output element at a frequency of about 10 Hz.

Commonly owned U.S. Patent Application Publication No. 2010/0252390 discloses a power take off gear using elastic elements to dampen undesirable vibration associated with the idle condition. However, due to the relatively low spring rate for the elastic elements, the elastic elements do not attenuate the resonance condition or prevent the undesirable noise associated with engine start-up.

Bumper springs have been used in systems where a second damper stage is required. Bumper springs become active when a built in degree of travel is reached. Once bumper springs are engaged the first stage springs work in parallel to the bumper springs resulting in higher capacity. Friction control plates have been used in parallel with a spring package to provide friction at large travel angles. Friction control plates are generally axially loaded plates located parallel to the main torque path made of material with durable wear properties such as high carbon steel or Teflon. The axial load is generated by a diaphragm spring. A defined amount of lash is built into the system so that the friction control plates do not engage until a certain travel is reached.

Both bumper springs and friction control plates can require increased amount of axial and radial space in a design. Bumper springs only provide a fully elastic element without impact absorption characteristics. Thus, the springs capture vibration energy in the system instead of absorbing the energy. The effectiveness of friction control plates is limited by the applied axial force and the number of friction surfaces.

SUMMARY

According to aspects illustrated herein, there is provided a torque transmitting device including: a flange forming an input for the device and including a damper stop tab extending radially outward; a plate including first and second curved slots; and a curved friction assembly including a first end disposed in the first curved slot, a second end disposed in the second curved slot, at least one curved engagement plate including an engagement tab extending radially inward, at least one curved friction plate rotationally fixed to the plate, and a resilient element urging the at least one curved engagement plate and the at least one curved friction plate into contact. The device includes at least one elastic element engaged with the flange.

According to aspects illustrated herein, there is provided a torque transmitting device including: a flange forming an input for the device and including a damper stop tab extending radially outward; a plate including first and second curved slots; and a curved friction assembly including at least one curved engagement plate. The engagement plate includes an engagement tab extending radially inward and at least partially circumferentially aligned with the damper stop tab, is at least partially rotatable with respect to the plate, and is at least partially disposed in the first and second curved slots. The friction assembly includes at least one curved friction plate: rotationally fixed to the plate; at least partially disposed in the first and second curved slots; and in contact with the at least one curved engagement plate. The friction assembly includes a resilient element: in contact with one of the at least one curved engagement plate or the at least one curved friction plate; and urging the one of the at least one curved engagement plate or the at least one curved friction plate into contact with the other of the at least one curved engagement plate or the at least one curved friction plate. The friction assembly includes at least one elastic element engaged with the flange. The flange is at least partially rotatable with respect to the plate such that the damper stop tab is engageable with the engagement tab.

According to aspects illustrated herein, there is provided a power take off gear including: a flange forming an input for the device and including a damper stop tab extending radially outward; a ring gear including a cavity opening to an inner circumference of the ring gear, first and second circumferentially curved slots open to the cavity, and third and fourth circumferentially curved slots radially outward from the first and second curved slots and open to the cavity; and a circumferentially curved friction assembly including: at least one circumferentially curved engagement plate including an engagement tab extending radially inward and at least partially disposed in the cavity and the first and second circumferentially curved slots; at least one circumferentially curved friction plate rotationally fixed to the ring gear and at least partially disposed in the cavity and the third and fourth circumferentially curved slots; and a resilient element urging the at least one circumferentially curved engagement plate and the at least one circumferentially curved friction plate into contact. The gear includes at least one elastic element engaged with the flange and the first and second cover plates. For first torque applied to the flange in a rotational direction at a first magnitude, the flange is arranged to rotate with respect to the ring gear in the rotational direction such that: the damper stop tab contacts the engagement tab; the flange displaces the at least one circumferentially curved engagement plate in the rotational direction; and frictional engagement of the at least one circumferentially curved engagement plate with the at least one circumferentially curved friction plate dissipates at least a portion of the first torque to dampen the rotation of the flange in the first rotational direction.

BRIEF DESCRIPTION OF THE DRAWINGS

The nature and mode of operation of the present invention will now be more fully described in the following detailed description of the invention taken with the accompanying figures, in which.

DETAILED DESCRIPTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspect. The present invention is intended to include various modifications and equivalent arrangements within the spirit and scope of the appended claims.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1A:
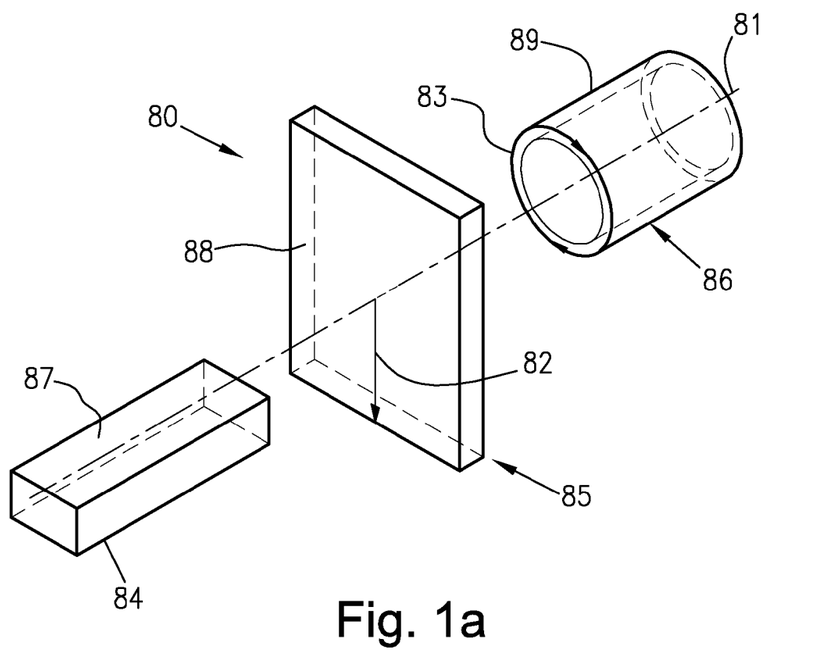
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
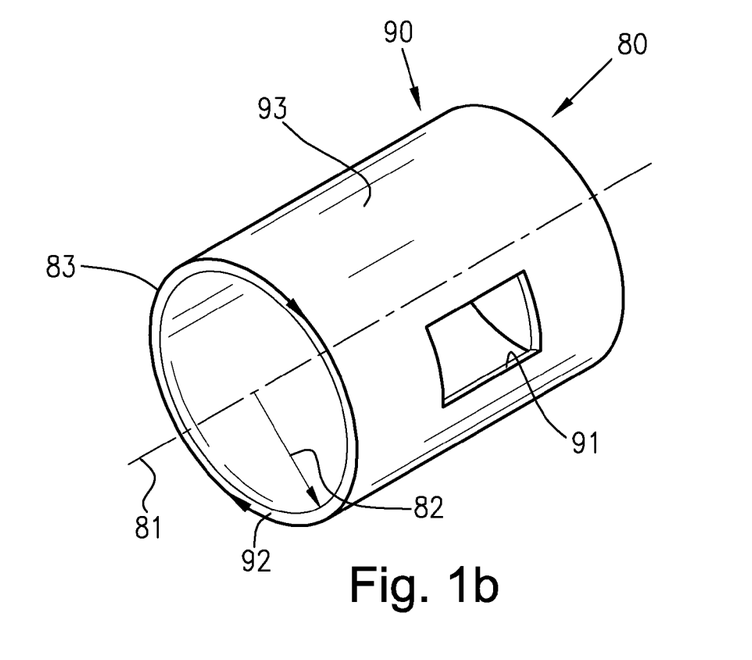
FIG. 1B is a perspective view of an object in the cylindrical coordinate system of FIG. 1A demonstrating spatial terminology used in the present application; and, FIG. 2 is a perspective front view of a torque transmission device with a friction controlled damper.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

Figure 2:
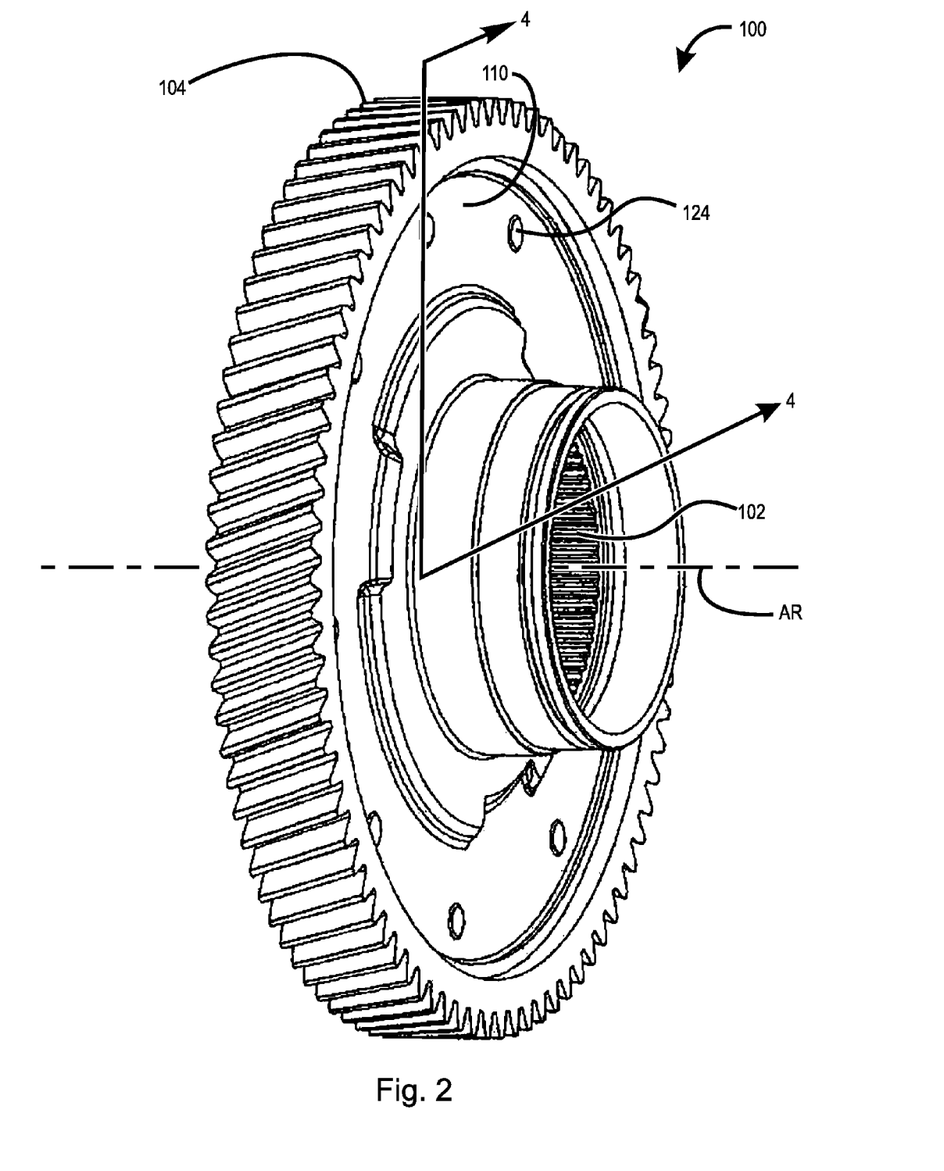

FIG. 2 is a perspective front view of torque transmission device 100 with a friction controlled damper.

Figure 3:
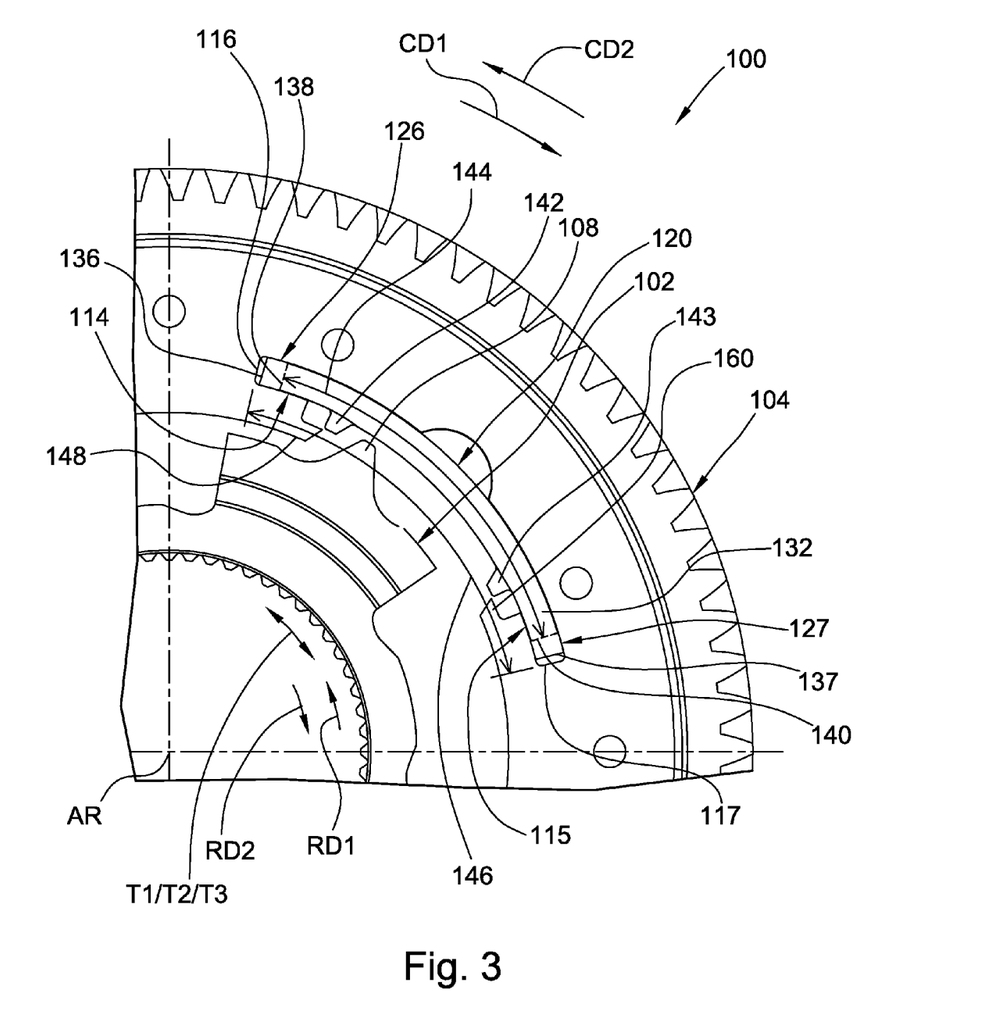
FIG. 3 is a partial front view of a torque transmission device with a friction controlled damper in a no-load state with a damper with a cover plate and elastic elements removed.

FIG. 3 is a partial front view of torque transmission device 100 with a friction controlled damper in a no-load state with a damper with a cover plate and elastic elements removed.

Figure 4:
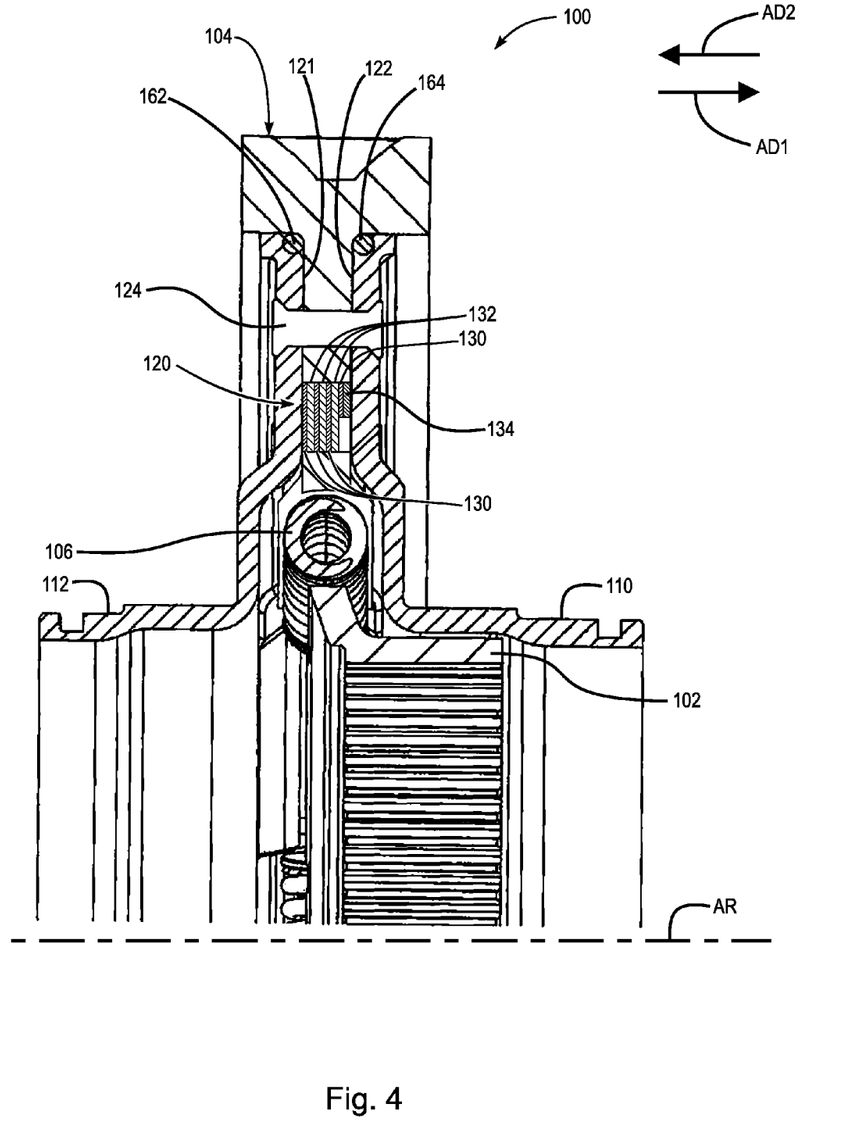
FIG. 4 is a partial cross-sectional view of the torque transmission device with a friction controlled damper of FIG. 2.

FIG. 4 is a partial cross-sectional view of torque transmission device 100 with a friction controlled damper of FIG. 2. The following should be viewed in light of FIGS. 2 through 4. By "no-load state" we mean that the flange described below is either free of a torque load or a torque loads is rotationally balanced (equal torque loads in directions RD1 and RD2 described below). Torque transmission device 100 with a friction controlled damper includes flange 102, plate 104, and at least one elastic element 106. In an example embodiment, device 100 includes cover plates 110 and 112. Flange 102 provides an input site for device 100 and includes damper stop tabs 108 forming a portion of an outer radial contour of device 100. Element 106 is drivingly engaged with flange 102 and cover plates 110 and 112. Cover plates 110 and 112 are fixedly secured to radially disposed sides 122 and 121 of plate 104 by any means known in the art, for example, rivet 124. As further described below, plate 104 is at least partially rotatable with respect to flange 102, for example, about axis of rotation AR for device 100.

In an example embodiment, device 100 is a power take off gear and plate 104 is a ring gear for the power take off gear. The discussion below is directed to the example of power take off gear 100.

Plate 104 includes curved slots 114 and 115 with ends 116 and 117, respectively. Gear 100 includes friction assembly 120 which includes ends 126 and 127 disposed in slots 114 and 115, respectively. Assembly 120 includes at least one curved friction plate 130, at least one curved engagement plate 132, and curved resilient element 134. Plates 130 and 132 and element 134 are curved in a circumferential direction. Plates 130 and 132 are at least partially axially aligned. Plate 130 includes ends 136 and 137 disposed in slots 114 and 115, respectively, and plate 132 includes ends 138 and 140 disposed in slots 114 and 115, respectively. In an example embodiment, resilient element 134 is non-rotatably connected to plate 104. Resilient element 134 urges the engagement and friction plates into contact. In an example embodiment, assembly 120 includes respective pluralities of plates 130 and 132 alternating (interleaved) in an axial direction, such as AD1. Plates 130 are non-rotatably connected to plate 104. In an example embodiment, cover plates 110 and 112 are in contact with assembly 120 and axially retain assembly 120. Plates 130 and 132 are generally flat plates made of material with durable wear properties, such as high carbon steel or Teflon. At least one of plates 130 and 132 may include a bonded friction material ring.

Engagement plate 132 includes engagement tabs 142 and 143 extending radially inward and circumferentially aligned with damper stop tab 108. In an example embodiment, circumferential length, or extent, 144 of plate 132 is less than circumferential length, or extent, 146 from end 116 to 117. Thus, plate 132 is circumferentially displaceable within slots 114 and 115.

For torque T1 applied to the flange in rotational direction RD1 at a first magnitude, the flange is arranged to rotate with respect to the ring gear in direction RD1, for example, by at least partially compressing element 106, such that tab 108 contacts tab 142. In turn, the flange displaces the engagement plate in direction RD1 and frictional engagement of the engagement and friction plates (due to force applied by element 134) dissipates at least a portion of the first torque to dampen the rotation of the flange in the first rotational direction, as further described below.

For torque T2 applied to the flange in direction RD1 and at a second magnitude, greater than the first magnitude, the flange is arranged to rotate with respect to the ring gear further in direction RD1 such that tab 108 contacts the ring gear at contact portion 148 and T2 is transmitted to the ring gear in direction RD1. Thus, the flange rotates the ring gear in direction RD1.

Figures 5A, 5B, 5C, 5D:
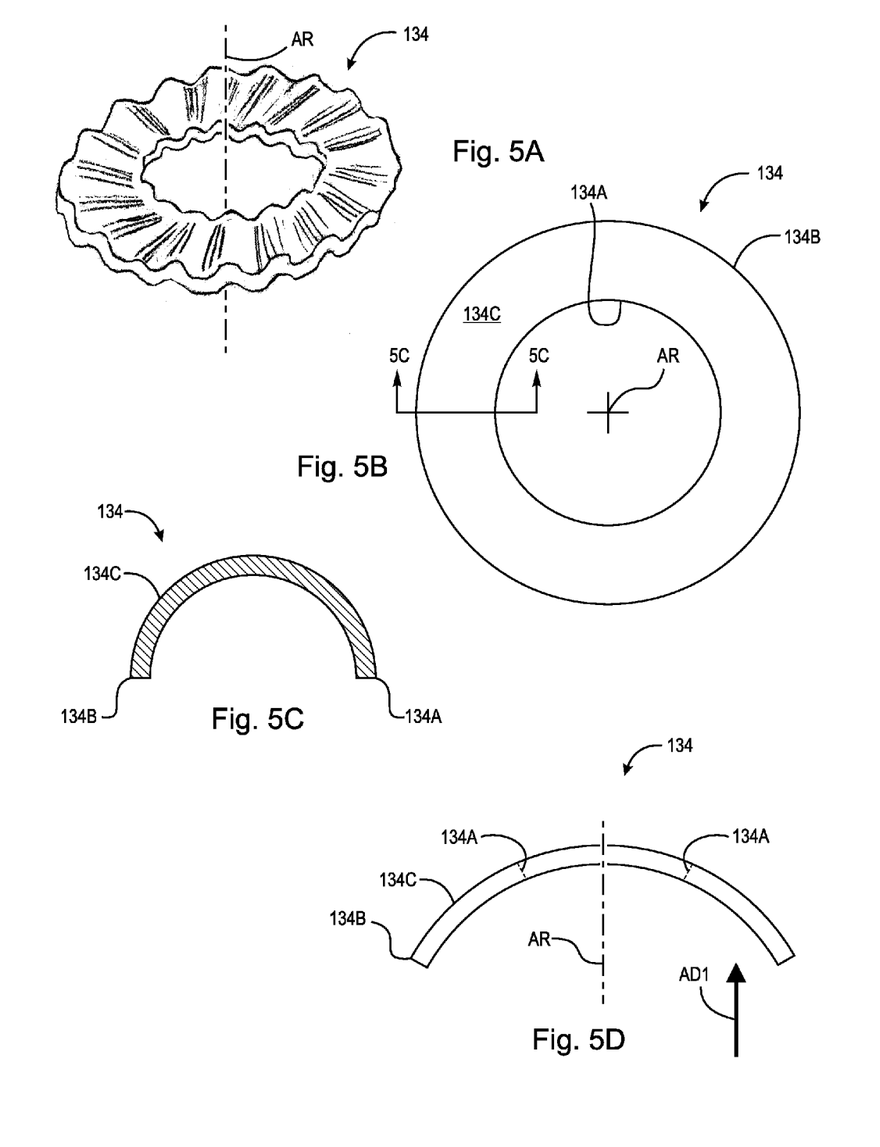
FIGS. 5A through 5D are respective views of a resilient element for a friction assembly; and, FIG. 6 is a partial front view of a torque transmission device with a friction controlled damper in a no-load state with a damper with a cover plate and elastic elements removed.

FIGS. 5A through 5D are respective views of a resilient element for friction assembly 120. In an example embodiment shown in the perspective view of FIG. 5A, resilient element 134 is a wave plate, that is, the plate undulates in an axial direction along a circumferential direction. In an example embodiment shown in the top view of FIG. 5B and the cross-sectional view of FIG. 5C generally along line 5C-5C in FIG. 5B, to increase load capacity, resilient element 134 is curved in a cross-section taken along a line orthogonal to axis AR. For example, inner edge 134A and outer edge 134B are co-planar orthogonal to axis AR and body 134C is curved in an axial direction between the inner and outer edges. In an example embodiment shown in the side view of FIG. 5D, to increase load capacity, resilient element 134 is bowed in an axial direction. For example, the inner and outer edges are non-planar orthogonal to axis AR. In an example embodiment (not shown), the respective configurations of the resilient element in FIGS. 5B and 5C are combined.

The discussion regarding torques T1 and T2 in direction RD1 is applicable to torques T1 and T2 applied to the flange in direction RD2, opposite direction RD1. That is, for torque T1 applied to the flange in a direction RD2, the flange is arranged to rotate with respect to the ring gear in direction RD2, for example, by at least partially compressing element 106, such that tab 108 contacts radially inwardly extending tab 143 of the engagement plate. In turn, the flange displaces the engagement plate in direction RD2 and frictional engagement of the engagement and friction plates (due to force applied by element 134) dissipates at least a portion of the first torque to dampen the rotation of the flange in the second rotational direction. For torque T2 applied to the flange in direction RD2, tab 108 is arranged to contact the ring gear at contact portion 160 to transmit T2 to the ring gear and displace the ring gear in direction RD2.

For torque T3 applied to the flange in direction RD1 or RD2 and below the first magnitude, the flange is arranged to rotate with respect to the ring gear in direction RD1 or RD2 such that element 106 is at least partially compressed and tab 108 and tabs 142 or 143 are separated by respective spaces in a circumferential direction. Thus, lower magnitude torque is "absorbed" by element 106 without activating assembly 120.

In an example embodiment, cover plates 110 and 112 are sealed to the ring gear at respective radially outer circumferences of cover plates 110 and 112, for example, by seals 162 and 164, respectively.

Figure 6:
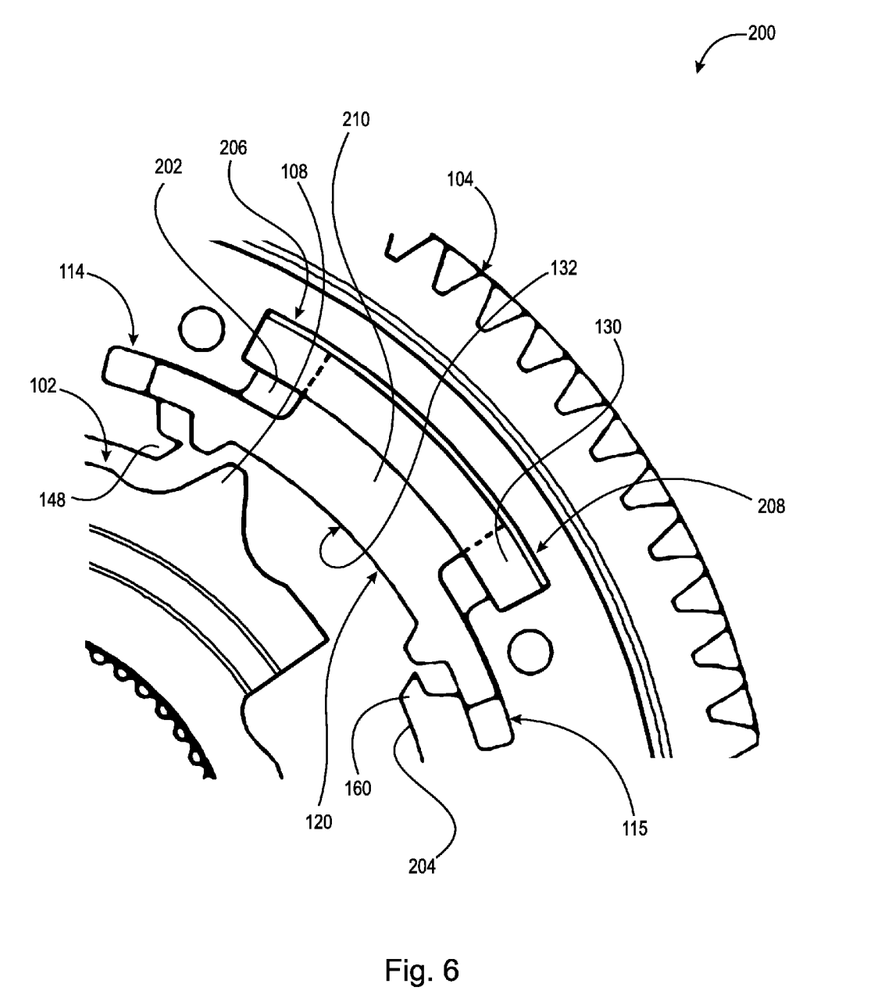

FIG. 6 is a partial front view of power take off gear 200 in a no-load state with a damper with a cover plate and elastic elements removed. The description for device 100 in FIGS. 2 through 4 is applicable to torque transmission device 200 with a friction controlled damper and FIG. 6 except as noted below. In the example of FIG. 6, device 200 is a power take off gear. In gear 200, the ring gear includes cavity 202 opening to inner circumference 204 of the ring gear and circumferentially curved slots 206 and 208 open to the cavity and located radially outward from slots 114 and 115. Friction plate 130 is at least partially disposed in the cavity and slots 206 and 208. Engagement plate 132 is at least partially disposed in the cavity and in slots 116 and 117. In particular, portion 210 of the engagement plate is disposed in the cavity, is at least partially axially aligned with plate 130, and is at least partially circumferentially aligned with slots 206 and 208. The frictional engagement described above occurs between portion 210 and plate 130. In an example embodiment, the contact area between the engagement and friction plates is increased in gear 200. By increasing the contact area between the engagement and friction plates, the friction torque in assembly 120 is increased as torque T1 is applied, providing increased dampening capacity.

The following provides further detail regarding devices 100 and 200. To simplify the presentation, the following discussion is directed to device 100; however, it should be understood that the discussion is applicable to device 200 as well. Device 100 provides an impact damper (assembly 120) parallel to the spring damper (element 106) white minimizing the number of components and required axial space. Device 100 enables a soft first stage is with large travel (compressing elements 106), along with a higher second stage with small travel (frictional engagement of the engagement and friction plates). Advantageously, device 100 provides dampening without increasing an axial extent of plate 104. Thus, device 100 can be used for applications in which space is too restrictive to use conventional second stage options such as bumper springs.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A torque transmitting device, comprising:
   a flange forming an input for the device and including a damper stop tab extending radially outward;
   a plate including first and second curved slots;
   a curved friction assembly including:
      a first end disposed in the first curved slot;
      a second end disposed in the second curved slot;
      at least one curved engagement plate including an engagement tab extending radially inward;
      at least one curved friction plate rotationally fixed to the plate; and,
      a resilient element urging the at least one curved engagement plate and the at least one curved friction plate into contact; and
   at least one elastic element engaged with the flange.

2. The torque transmitting device of claim 1, wherein:
for first torque applied to the flange in a rotational direction at a first magnitude, the flange is arranged to rotate with respect to the plate in the rotational direction such that:
  the damper stop tab contacts the engagement tab;
  the flange displaces the at least one curved engagement plate in the rotational direction; and,
  frictional engagement of the at least one curved engagement plate with the at least one curved friction plate dissipates at least a portion of the first torque to dampen the rotation of the flange in the rotational direction.

3. The torque transmitting device of claim 2, wherein for second torque applied to the flange in the rotational direction and at a second magnitude, greater than the first magnitude, the flange is arranged to rotate with respect to the plate in the rotational direction such that:
  the damper stop tab contacts the plate; and,
  the second torque is transmitted to the plate in the rotational direction.

4. The torque transmitting device of claim 1, wherein the resilient element is curved in a cross-section taken along a line orthogonal to an axis of rotation for the device.

5. The torque transmitting device of claim 1, wherein the resilient element is bowed in an axial direction such that radially inner and outer edges of the resilient element are non-planar orthogonal to an axis of rotation for the device.

6. The torque transmitting device of claim 1, wherein:
  the at least one engagement plate includes a plurality of engagement plates; or,
  the at least one friction plate includes a plurality of friction plates.

7. The torque transmitting device of claim 1, wherein:
  the at least one engagement plate includes a plurality of engagement plates;
  the at least one friction plate includes a plurality of friction plates; and,
  respective engagement plates alternate with respective friction plates in an axial direction.

8. The torque transmitting device of claim 1, further comprising first and second cover plates fixedly secured to the plate and in contact with the circumferentially curved friction assembly.

9. The torque transmitting device of claim 1, wherein the torque transmitting device is a power take off gear.

10. A torque transmitting device comprising:
  a flange forming an input for the device and including a damper stop tab extending radially outward;
  a plate including first and second curved slots;
  a curved friction assembly including:
    at least one curved engagement plate:
      including an engagement tab extending radially inward and at least partially circumferentially aligned with the damper stop tab;
      at least partially rotatable with respect to the plate; and,
      at least partially disposed in the first and second curved slots;
    at least one curved friction plate:
      rotationally fixed to the plate;
      at least partially disposed in the first and second curved slots; and,
      in contact with the at least one curved engagement plate; and,
    a resilient element:
      in contact with one of the at least one curved engagement plate or the at least one curved friction plate; and
      urging the one of the at least one curved engagement plate or the at least one curved friction plate into contact with the other of the at least one curved engagement plate or the at least one curved friction plate; and
  at least one elastic element engaged with the flange, wherein:
  the flange is at least partially rotatable with respect to the plate such that the damper stop tab is engageable with the engagement tab.

11. The torque transmitting device of claim 10, wherein for first torque applied to the flange in a rotational direction at a first magnitude, the flange is arranged to rotate with respect to the plate in the rotational direction such that:
  the damper stop tab contacts the engagement tab; and,
  the flange displaces the at least one curved engagement plate in the rotational direction.

12. The torque transmitting device of claim 11, wherein for second torque applied to the flange in the rotational direction and at a second magnitude, greater than the first magnitude, the flange is arranged to rotate with respect to the plate in the rotational direction such that:
  the damper stop tab contacts the ring gear; and,
  the second torque is transmitted to the plate in the rotational direction.

13. The torque transmitting device of claim 10, wherein the at least one engagement plate includes:
  a first circumferential end disposed in the first curved slot; and,
  a second circumferential end disposed in the second curved slot.

14. The torque transmitting device of claim 10, wherein the at least one friction plate includes:
  a first circumferential end disposed in the first curved slot; and,
  a second circumferential end disposed in the second curved slot.

15. The torque transmitting device of claim 10, wherein:
  the at least one engagement plate includes a plurality of engagement plates; or,
  the at least one friction plate includes a plurality of friction plates.

16. The torque transmitting device of claim 10, further comprising first and second cover plates fixedly secured to the plate and in contact with the curved friction assembly.

17. The torque transmitting device of claim 10, wherein the torque transmitting device is a power take off gear.

* * * * *